US009386108B1

(12) United States Patent
Waite et al.

(10) Patent No.: US 9,386,108 B1
(45) Date of Patent: Jul. 5, 2016

(54) AUTOMATED RARE SPECIES AND NEW SPECIES DISCOVERY ALERTS VIA CROWDSOURCING

(71) Applicant: Mitchell Waite, Mill Valley, CA (US)

(72) Inventors: Mitchell Waite, Mill Valley, CA (US); Richard Stephens, Pensacola, FL (US)

(73) Assignee: Mitchell Waite, Mill Valley, CA (US)

( * ) Notice: Subject to any disclaimer, the term of this patent is extended or adjusted under 35 U.S.C. 154(b) by 364 days.

(21) Appl. No.: 13/896,288

(22) Filed: May 16, 2013

Related U.S. Application Data

(60) Provisional application No. 61/647,961, filed on May 16, 2012.

(51) Int. Cl.
*G06F 15/16* (2006.01)
*H04L 29/08* (2006.01)

(52) U.S. Cl.
CPC ...................................... *H04L 67/22* (2013.01)

(58) Field of Classification Search
CPC ........................................................ H04L 67/22
USPC ................................................. 709/203–204
See application file for complete search history.

(56) References Cited

U.S. PATENT DOCUMENTS

| 6,772,142 | B1 | 8/2004 | Kelling et al. |
| 7,149,980 | B1* | 12/2006 | Nelson ................... G06Q 10/10 715/751 |
| 8,135,800 | B1* | 3/2012 | Walsh et al. .................. 709/217 |
| 2004/0107104 | A1* | 6/2004 | Schaphorst ............. G10L 17/26 704/270 |
| 2006/0002317 | A1* | 1/2006 | Punaganti Venkata .............. H04M 3/4872 370/310 |
| 2011/0196923 | A1* | 8/2011 | Marcucci ............... G06Q 10/10 709/204 |
| 2012/0179557 | A1* | 7/2012 | Gross .......................... 705/14.73 |
| 2013/0159330 | A1* | 6/2013 | Smith ........................... 707/758 |
| 2013/0282810 | A1* | 10/2013 | Lessin .................... G06Q 50/01 709/204 |

\* cited by examiner

*Primary Examiner* — Duyen Doan
(74) *Attorney, Agent, or Firm* — Thomas M. Freiburger

(57) ABSTRACT

This invention provides a social network for wildlife species observers, e.g. birders, to verify accuracy of observations made of wildlife in the field, and includes issuance of automatic rare species alerts when a sighting is determined to be rare, all via a web site.

25 Claims, 24 Drawing Sheets

FIG. 9

AUTOMATED RARE SPECIES AND NEW SPECIES DISCOVERY ALERTS VIA CROWDSOURCING

This application claims benefit of provisional application No. 61/647,961, filed May 16, 2012.

BACKGROUND OF THE INVENTION

This invention concerns a web driven system or application for recording and sharing observations of birds or other wildlife species on a social networking platform, and for generating an accurate collection of bird observations and issuing rare species discovery alerts, via crowdsourcing.

Bird watching or "birding" is the practice of observing birds. It is both a hugely popular hobby as well as a serious scientific endeavor. An estimated 100 million "birders" spent $93 billion in 2009 on birding.

The sensitivity of avian life allows the scientific community to study bird migration as an excellent method to measure the condition of the earth's ecological health. However, studies of migration depend heavily on the accurate observations of birds.

Technology, in the form of mobile computer devices such as smartphones, has greatly improved the accuracy of such bird observation. Today software applications or "apps" for smartphones and tablets use features such as "search engines" to replace the inefficient guessing required by the printed field guides. These apps have in turn led to a great increase in the number of people aware of and actively observing bird life.

iBird, an application available for iPhones, iPads, tablets and other portable computer devices, helps bird watchers identify birds found in the field and includes illustration renderings, photographs and bird sounds as well as listings of particular bird characteristics, and has been a very successful product. iBird can be used in the field without Internet connection.

eBird is a web site program for bird watchers that enables them to upload information including names of birds observed, in a step-by-step process. eBird provides a platform that helps a bird watcher record bird sightings, which can be over a long period of time. The eBird system runs on the Internet and users connect to it with a web browser, and via this connection the user uploads observations, which are stored on a web server. The eBird system primarily follows what is described in U.S. Pat. No. 6,772,142. The patent teaches that bird observation data from these uploads can be correlated with geographic information by the server, and collectively the data from many observers can be analyzed to determine bird population at various geographic locations, as well as bird migration patterns.

However, there has been no reliable way of verifying the accuracy of a person's sightings of a bird species. Indeed, the reliability of bird identification is riled with issues, which have to do with the variability of our senses, and leads to unpredictable observations and reporting of observations. Further, no prior shared species observation system had any capability to alert or inform users of unusual sightings of species. Users must constantly review the database visually.

SUMMARY OF THE INVENTION

In the invention described herein, bird watchers use an interactive web based system or application, also suitable for mobile devices, to enter bird observations, with date and location and other information, to keep a personal record and history of observations, as well as to maintain a list of personal bird watching locations and diary comments about these observations. A social networking aspect of the system or application enables the users to share observations with other system users and to communicate with all others or with particular users. A very important aspect of the system is voting. When a user uploads an observation to the system, others users can vote that observation UP or DOWN, i.e. whether or not the voter believes the observation is credible. In addition, the system includes an achievement aspect, whereby a bird watcher is given points for observations which are determined by voting to be confirmed, and those points are based on rarity of the bird (or rarity at a particular location or season or time), as well as other parameters. Several different levels of achievement awards are given for high-point achievers. If an observation is made of a sufficiently rare bird, "a rare bird alert" can automatically be sent out to all users. These alerts appear on the user's "Wall"; however, they may also be sent to the user by email, text message or push notifications.

As in other social media, a user of the system can "follow" one or more other users, via the public profile of the other user. Another unique aspect is that members can follow the observations made for particular species of birds or for observations at certain geographic locations. With this feature one can find the appearance of any bird in any place in North America almost instantly. One preferred embodiment includes the ability to post observations from the users to other social networks such as Facebook, Twitter, etc., which enables the invention to gather a larger number of voters.

As in U.S. Pat. No. 6,772,142 noted above, the data from the many bird watcher users of the system of the invention can be much more valuable in determining bird populations by location and bird migration patterns. The data will have a higher degree of accuracy because the voting aspect of the system guarantees that the data is "vetted" or verified by other expert birders.

The invention is thus a system and a method for recording observations of wildlife in the field on a portable device or at a stationary desktop computer whereby said observations are immediately uploaded to an Internet server if Internet connectivity is available or cached and uploaded to an Internet server at a later time when Internet connectivity becomes available. Birds are primarily featured here, but other wildlife species (plant or animal) can be the subject of the system. One important social aspect of the system is that it brings together people having a common interest.

Unique features of the system are automatic rare species alerts and discovery of new species by alerts. These alerts are possible without experts because of the way the system works.

The process begins with a user registering at the system web site. The server software determines the user's home location through his browser or mobile device using a "places" look up system (e.g. via GPS), or by another locator such as IP address). If registration is done via a portable device connected to the Internet using a mobile browser the same technique is used. If the user's portable device is not tethered to the Internet then the location is determined using geolocation hardware in the device and cached so that later when the device is connected to the Internet a lookup service is used to find the nearest town or city to the registered user. In both cases the nearest town or city is called the user's home location.

A server based database of the system can contain all species of wildlife found in the world, or it can contain all of certain species (such as birds). Each species consists of a record in the database and contains distribution information for the species in the form of geospatial shape maps whose polygons represent the areas of habitation (such as the data found on natureserve.com). The examples in this patent refer to birds but they are only one of many types of wildlife that can utilize the idea in this patent. In the description below the system is called "Trillity".

It is thus an object of the invention to enable bird or other species watchers to keep a record of observations and share observations on a social network, with peer evaluation of observations via voting, and to create a higher degree of accuracy in the recorded observations collected from many bird watchers via crowdsourcing, along with other social networking benefits. These and other objects, advantages and features of the invention will be apparent from the following description of a preferred embodiment, considered along with the accompanying drawings.

DESCRIPTION OF THE DRAWINGS

FIGS. 6 through 24 are example screen shots showing various displays for different functions and routines of the system of the invention.

DESCRIPTION OF PREFERRED EMBODIMENTS

Figure 1:
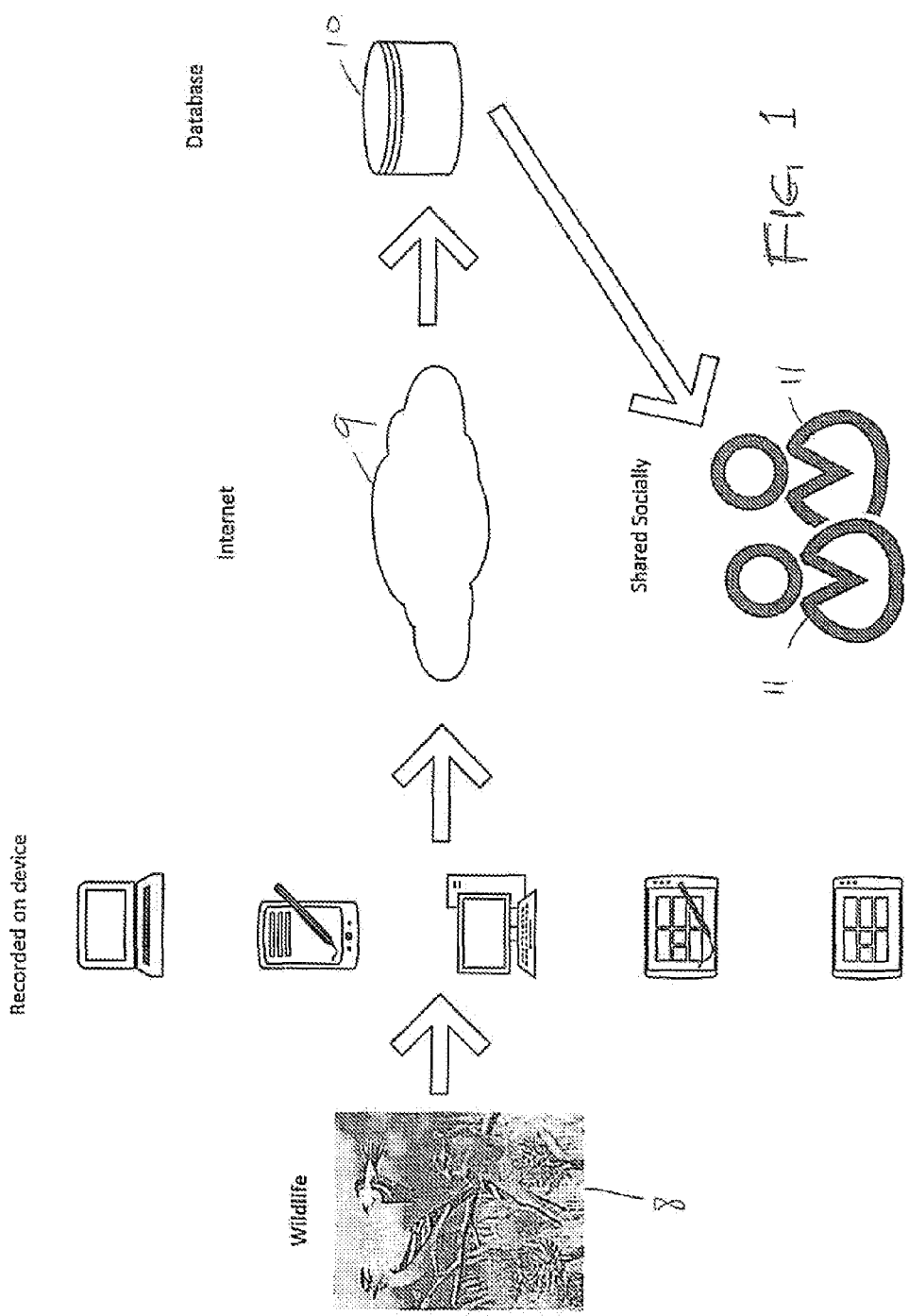
FIG. 1 is a simple diagram generally indicating flow of information with the system of the invention.

FIG. 1 indicates schematically flow of observations and information through the system of the invention. The photograph at 8 indicates an observation, which can optionally, but not necessarily include a photograph and/or an audio recording of a vocalization of the species, such as a bird song. This is stored on a device such as a desktop or laptop computer or smartphone, as indicated. The content of the observation can be stored in the field such as with a smartphone, iPad or other portable computer device, or notes can simply be taken in the field and later entered into a user's computer, using the software template provided by the system. As indicated in FIG. 1, the information regarding an observation is sent via Internet 9 to a central system server with database, indicated at 10. The central system sends the observation information to a multiplicity of users 11, all users except any who have filtered out certain kinds or categories of observations.

User Interaction with System

Figure 2:
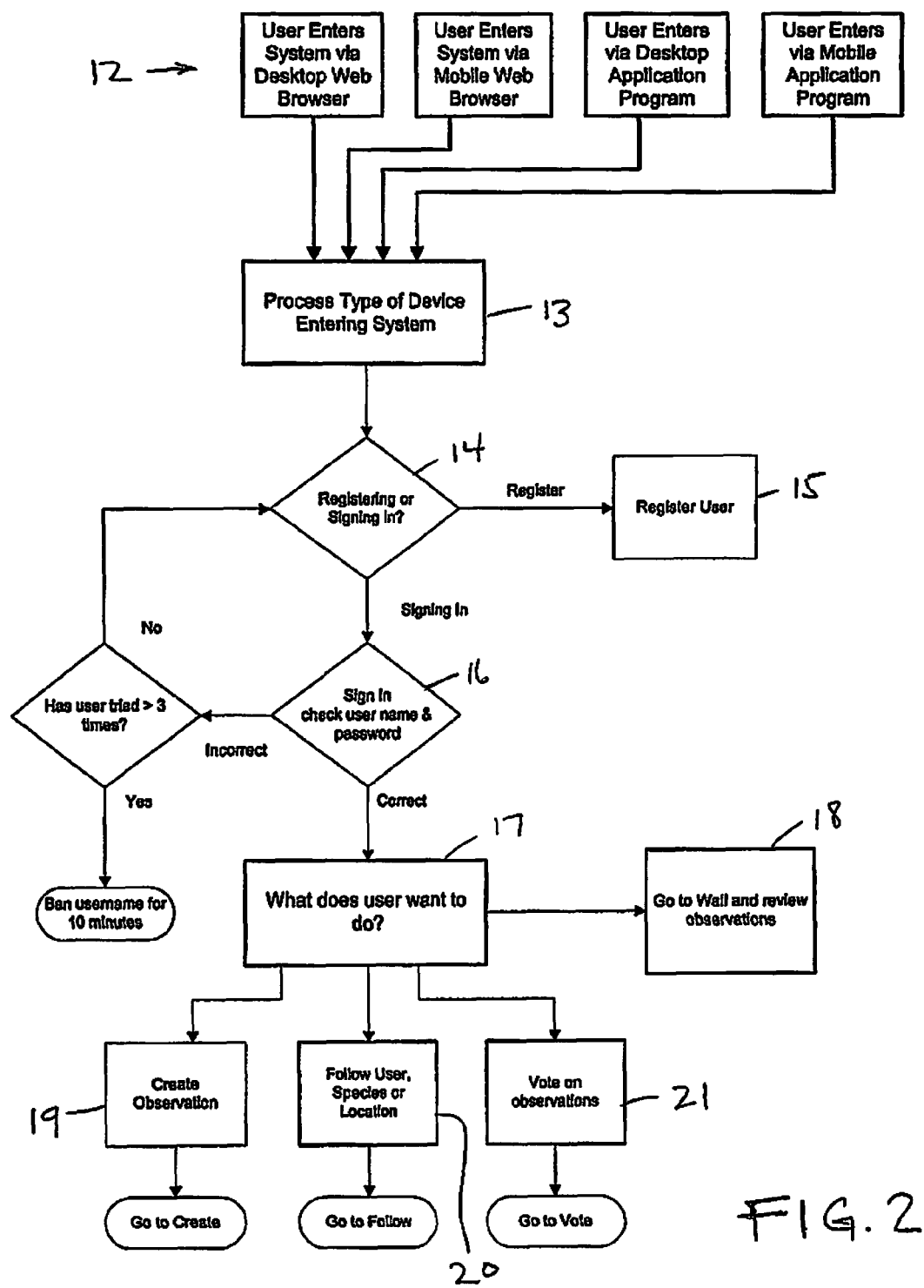
FIG. 2 is a flow chart showing user interaction with the system of the invention, indicating users signing in, registering and deciding what they wish to do.

FIG. 2 is a schematic chart showing user interaction flow. The user enters the system as indicated at 12, via a desktop web browser, mobile web browser, desktop application program or mobile application program. The block 13 indicates the system processes the type of device entering the system, since communication format will be set to the type of device. The decision block 14 queries whether the user is registering into the system or signing in. If registering, this is indicated in the block 15, registration being discussed elsewhere herein. If signing in, a typical routine involving user name and password is indicated in the decision blocks 16 and others to the left, with more than three failed attempts resulting in a timeout as noted. After a proper sign-in the system is ready for the user to indicate what he wants to do on the site, as noted in the block 17. If the user wants to go to the user's "Wall" to review posted observations, this is shown in 18. The block 19 notes when the user wants to create an observation; the block 20, to follow another user, a species or a location; and the block 21, to vote on one or more observations of others. Carrying out the selected function is indicated below these blocks.

The following are certain terms used in the description of the system of the invention, with definitions:

| Term | Definition |
|---|---|
| Observation | The atomic unit that makes up the basic data in Trillity. Represents a sighting of a particular species. The observation contains the username of the person who made it, common name of the species, and any information about the sighting that the user has included such as conditions, number of species, etc. |
| Observation Status | The "state" of the observation meaning is it confirmed, unconfirmed or unknown. |
| Valid | A user voting that they believe the observation is correct votes it as being valid. |
| Up vote | When a user votes a observation correct it is an up vote |
| Invalid | A user voting that they believe the observation is incorrect votes it as being invalid. |
| Down vote | When a user votes an observation incorrect it is a down vote. |
| Unknown | The state of an observation while it is being voted on and has yet to be confirmed or unconfirmed. When an observation is withdrawn its status changes to Unknown. |
| Confirmed | An observation, which has received enough positive votes that it passes the threshold for, its status being changed to confirmed, credible or approved. |
| Unconfirmed | An observation, which has received enough negative votes that it passes the threshold for, its status being changed to unconfirmed or unapproved. |
| Approved | Same as Confirmed. |
| Unapproved | Same as Unconfirmed. |
| Credible | Same as Confirmed. |
| Threshold | The value assigned to the sum of positive plus negative points, which triggers an observation status as approved or unapproved. Currently +5 is approved and −5 is unapproved. |
| Following | The act of having the observations displayed on the nest or wall of the follower (person who initiated the following). |
| Following User | All the observations of any registered user who is being followed. |
| Following Species | The observations of any species of wildlife that are being followed. |
| Following Location | All observations of species in a particular location that is being followed. |
| Trill Score | The number of points assigned to the creator of any observation that has been deemed confirmed. Only confirmed observations receive points. |
| Formula | The algorithm for calculating the number of points to assign an observation that has been confirmed. |
| Wall | The area of a users screen that displays all the observations they make as well as any observations that are being followed. |
| Lists | Any number of observations assigned to a group with a specific name. An observation may be assigned to multiple Lists. |
| Comments | The notes left on any observation by any user including the creator of the observation. |

Registration into the System

Users are presented with standard registration fields, including a zip code. The zip code is used to create the first location for the user, referred to as their Home location. The zip code is geocoded to a GPS location. In the flow chart of FIG. 3, registration is noted as a first step, at 23.

Registered users are redirected to a page to provide profile information preferably including display name, an avatar image, and whether to make all observations public by default or private. This means that after they make an observation will it be automatically viewable by the public or will it remain only privately viewable unless they specify otherwise.

Contents of Profile

Every registered user has a profile where they are able to change what information in an observation is displayed, the default status of public observations, and change password.

A profile contains all the important details about the creator of the observation including real name, user name, preferably an avatar photo, the Trill score (accumulated points, explained below), number of total observations they have made on Trillity, the date they joined, and their interests.

When a user's profile is public, it can be viewed by anyone and can be browsed to from an observation or a user search.

A user can be "followed" by clicking a link on the user's profile (explained further below).

Observation Points and User Scoring

A user carries a score and birder ranking. Each observation that a user makes receives a number of points based on various parameters such as how rare the bird is, how far it is from its normal migration area, the time of the year or of day, etc. Each registered user accumulates a total number of points based on each observation's score. Observation points are only applied to a user's score if it has been validated via voting. An invalid observation does not receive any points.

An observation status remains unknown until it has been voted as confirmed or unconfirmed. Confirmed means a number of votes have been cast affirming the observation is likely to be valid for that species. Unconfirmed means that a number of votes have been cast affirming the observation is likely to be invalid for that species. Once the critical number of up or down votes has been reached the observation status is changed from Unknown to Confirmed or Unconfirmed.

Trillity keeps track of each user's accumulated points and calls it a "Trill" score. A user's Trill score increases a fixed number of points, determined by a formula, if it is confirmed. No points are awarded if it is unconfirmed. The observation may be withdrawn and resubmitted with more information so it can be voted on again. When withdrawn its status changes from unconfirmed to unknown. Essentially the submitter gets a second chance to have the observation confirmed. By default an observation can be withdrawn and resubmitted as many times as the user wishes.

Locations

Users can create locations when creating observations. Observations store a friendly name (user name), a description, a "real address", and a GPS location. A location is a point and a location area is a circle of a certain radius in miles from that point.

A location can be created three ways.
1. Picking a location on a map. The Trillity web app loads a Google map into the user's browser. The map starts out with its location centered on the user's Home location (based on a lookup in the browser or the setting they create in their profile). A pin can be dropped and moved around on the map and a GPS location derived from it. From the GPS location, a "Real Address" and "friendly name" for that location can be derived or overridden by editing text in text boxes.
2. Picking a Hotspot. A user can select from a list of Hotspots which are popular sites where birds are known to congregate. A crowdsourced collection of Hotspots is created by users adding sharable Hotspot locations to the database.
3. Searching city or place. Users can search the database for a place or city by simply typing its name.

A user can use any location to filter observations. Birds that have been observed by other registered users and made public will be included in the filtered list along with the birds which are known to be found within a certain number of miles from that location. Thus the user sees a list of birds that may be in their location area as well as a list of birds that have been observed in their location area, and this can be consulted before posting an observation.

Lists

Lists are used for grouping observations. Any observation can be assigned to a list, removed from a list or copied from one list to another. A list is composed of a name, description (with location), and date. A list can be marked as public or private.

If private, no observations will be made visible to anyone else.

Species

A species is any form of fauna that can be observed. For convenience birds are used as the example species here. A bird species consists of English, Spanish, and French names, Banding Code, ITIS code, IUCN Conservation Status value and family name. IUCN Conservation Status is the population condition for the species, e.g. its abundance.

A person can view a list of observations for any specified species.

Following

A user can choose to follow a location, species, or user. Following is similar to following a person on Twitter, meaning that all of the specified person's tweets appear on a user's account.

Following a Trillity user requires that the followed user authorizes to be followed in their settings. When a user is followed all their observations can be displayed on the user's "wall" (display on screen). Filters can be applied to lower the amount of data that appears so it is not overwhelming. Filtering can include limiting the starting date, the number of observations each user makes (e.g. just show me the first N each day), etc.

Figure 20:
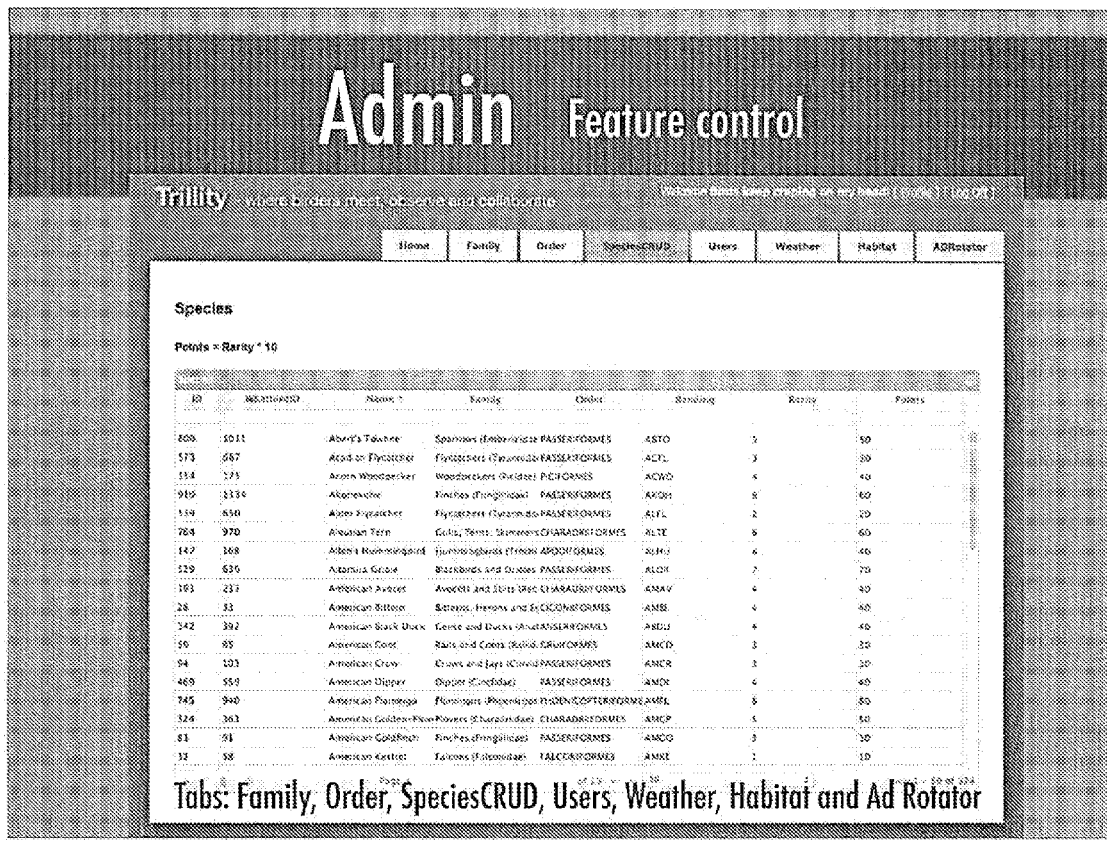
Figure 21:
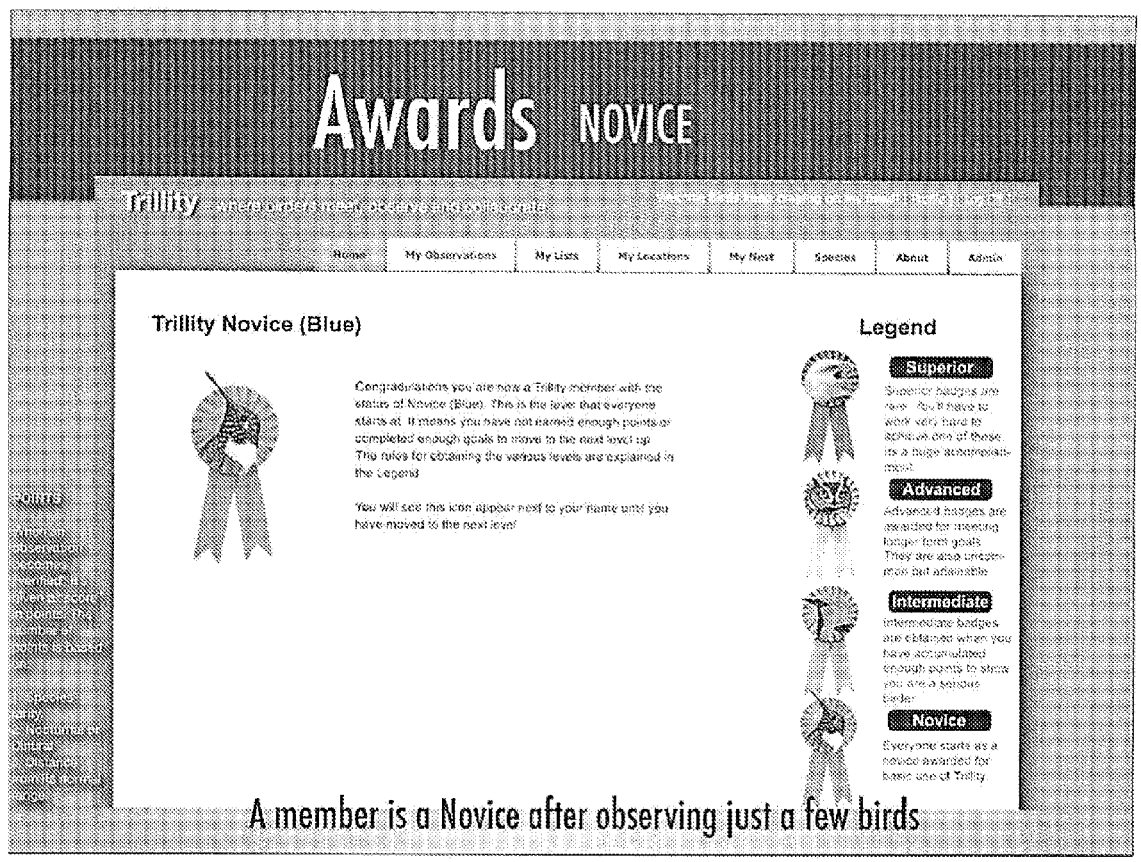
Figure 22:
Figure 23:
Figure 24:

A species can be "followed", meaning any registered user can select any species in the database and every observation made by any registered user of that species who has authorized following will appear on the user's "My Nest". A nest is analogous to a "wall" in Facebook and is often referred to herein as the user's "Wall". Filters can be applied to lower the amount of data that appears so as not to be overwhelming. All observations, of the user and of others, other than those filtered out, are displayed on the user's Wall. See the screen image of FIG. 20, showing My Nest. This monitors the Trillity users and species the user is following. It provides a real time stream of all observations of the other users/observers the user is following, as well as any species the user is following, and preferably any locations the user is following. The area on the right of the screen shows "People I Follow", "People Following Me", and "Species I Follow".

A location can be followed as noted above, meaning all observations within X miles of the user's selected location will be displayed on the user's My Nest. The user can control the radius (X) and other filters can be applied to lower the amount of data that appears so it is not overwhelming.

Observations

Observations make up the core atomic unit of Trillity. They are somewhat analogous to the tweets in Twitter except much more data is involved. Observations are comprised of fields presented by the software for entry of information describing many aspects of the observation such as what species was seen, when was it seen, where it was seen, its physical condition, number of the species observed, etc.

Note that, as indicated in the screen images of FIGS. 6-24, the main screens the user can see are My Observations, My Lists, My Locations and My Nest.

Figure 3:
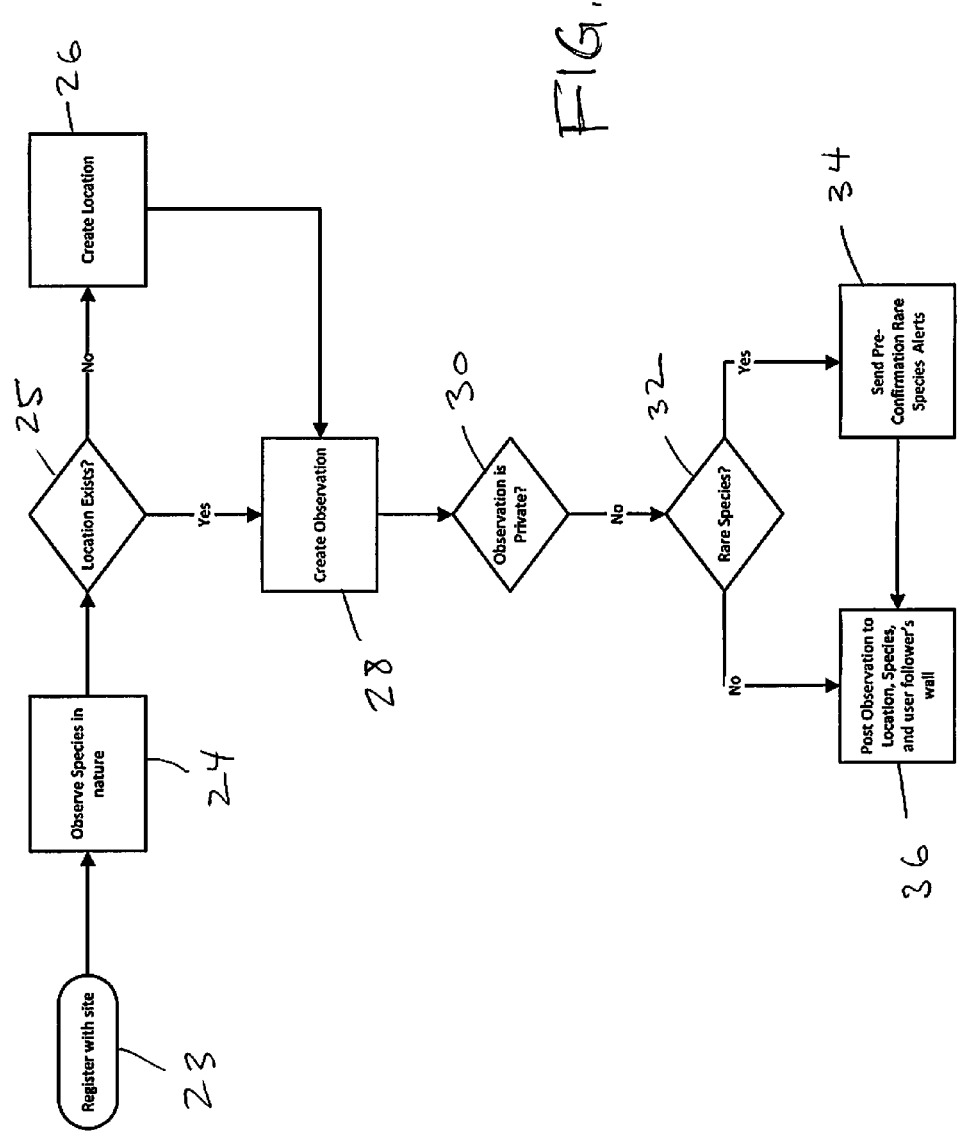
FIG. 3 is a flow chart indicating observation of a wildlife species by a user of the system, and creation and posting of the observation.

FIG. 3, a simplified flow chart, indicates creation and posting of an observation. The user registered on the site, as in 23 in FIG. 3. An observation of a species is indicated at 24. The location of the observation may or may not already exist, as it could be in the user's "home". Or it could automatically be identified by GPS or otherwise pre-indicated before entry of other data. The decision block 25 queries whether the location already exists. If not, the location is created, as by user entry, block 26. An observation can be created, as at 28, with this minimal data, assuming the needed user name and date are entered automatically. If the observation has not been made private (block 30), the system proceeds to query whether this is a rare species, as noted in the decision block 32. This is preferably determined automatically by the system, as indicated in another flow chart herein, based on several criteria. If this is indeed a rare species sighting, a rare species alert is sent out to the users of the system, as noted at 34. Then, the chart indicates that the observation is posted in the system to the location identified, to the species and to any user follower's "wall" (block 36). As indicated, if it is not a rare species sighting, (block 32) a flow is directly to the "post observation" block at 36. FIG. 3 shows the rare species alert being sent as the observation is posted (at block 34). This is a pre-confirmation alert, prior to confirmation of the observation by peer voting (discussed below in connection with FIG. 4). Voting can be over several days, and, even though a post-confirmation rare species alert has more weight than a pre-confirmation alert, birders in particular will not want to wait until confirmation of an observation; they may want to travel to the location as soon as a rare species is sighted. The pre-confirmation alert will be accompanied by a notation that it has not been confirmed. In a preferred implementation of the system both pre-confirmation alerts and post-confirmation alerts will be sent.

Users enter observation information into fields as described below.

Map: Every Trillity observation contains a map that shows where the observation was made. A tag on the map indicates the exact location visually.

Observation List: All observations are part of a list. Lists can be managed by a List Manager.

Public, Private, or Friend: An observation may be public or private and this is set by the person who make the observation. Public observations are visible and notable by other users while private observations do not appear visible to the public. Public/Private status is a global setting in the user's profile but each observation can be overridden by the user. Setting observations as private does not prevent a user from any kind of public following. Friend mode allows for sharing of observations if a two way following exists.

Sharing: An observation can be shared by anyone on social media. Clicking a share button on an observation will show a dialog box for entering additional information and posting it to a Facebook or Twitter wall. Not limited to Twitter or Facebook.

Date: The date tells the day and time the observation occurred. It is automatically set when an observation is created but may be modified at any time.

Notes: Specify any additional information about this observation.

Weather: What was the weather like when this species was observed? Preferably the system uses the Yahoo weather API (or another online weather reporting service) so that all weather input is standardized among users.

Age: What was the age of this species when it was observed (if known, optional)?

Sex: What sex was the species when it was observed (if known, optional)?

Other fields include (many being optional):
a. Count—how many species were seen
b. Location name—Name of place the observation was made
c. Latitude and longitude
d. Habitat—coast, forest, desert, etc.
e. Distance covered (miles)
f. Area covered (acres)
g. Started—time the observation began
h. Duration—how long in minutes the observation lasted
i. Number of observers
j. All reported (yes or no)
k. Protocol type—undefined, casual observation, stationary count, traveling count, area count
l. Tags—words user creates to help them search observations. These can be chosen from a tag cloud.
m. Observation list—the name of the list that this observation is attached to.
n. Creation date—The date the observation was created, as opposed to when the observation occurred.

Media: Data in the form of audio and images can be attached to an observation.
a. Sounds: Recordings of the songs, calls or any sounds the species makes to communicate can be uploaded and played on the observation. When a recording is uploaded it appears on the observation as a named audio clip with a player button so viewers can listen to the sounds.
b. Images: Any kind of photo or image related to the observation can be uploaded and displayed on the observation. When a photo is added to an observation its displayed in a fixed size. Additionally, photos will appear as thumbnails underneath it.

There are some actions that can be taken to add to any other user's observations. Observations can be voted as confirmed or unconfirmed by any registered user clicking an up or down arrow that is adjacent to the observation. A database retains all votes. A user can only vote once per observation. This is further explained below. Also, users can leave comments on any observations. The date of the comment is added to the comment along with the username of the registered user who left the comment. User comments work like those in a forum thread. Administrators can moderate user comments, meaning they can ban them, delete them, etc. Preferably, comments are run through Kismet (an automatic online filter) to minimize spam.

Voting

Figure 4:
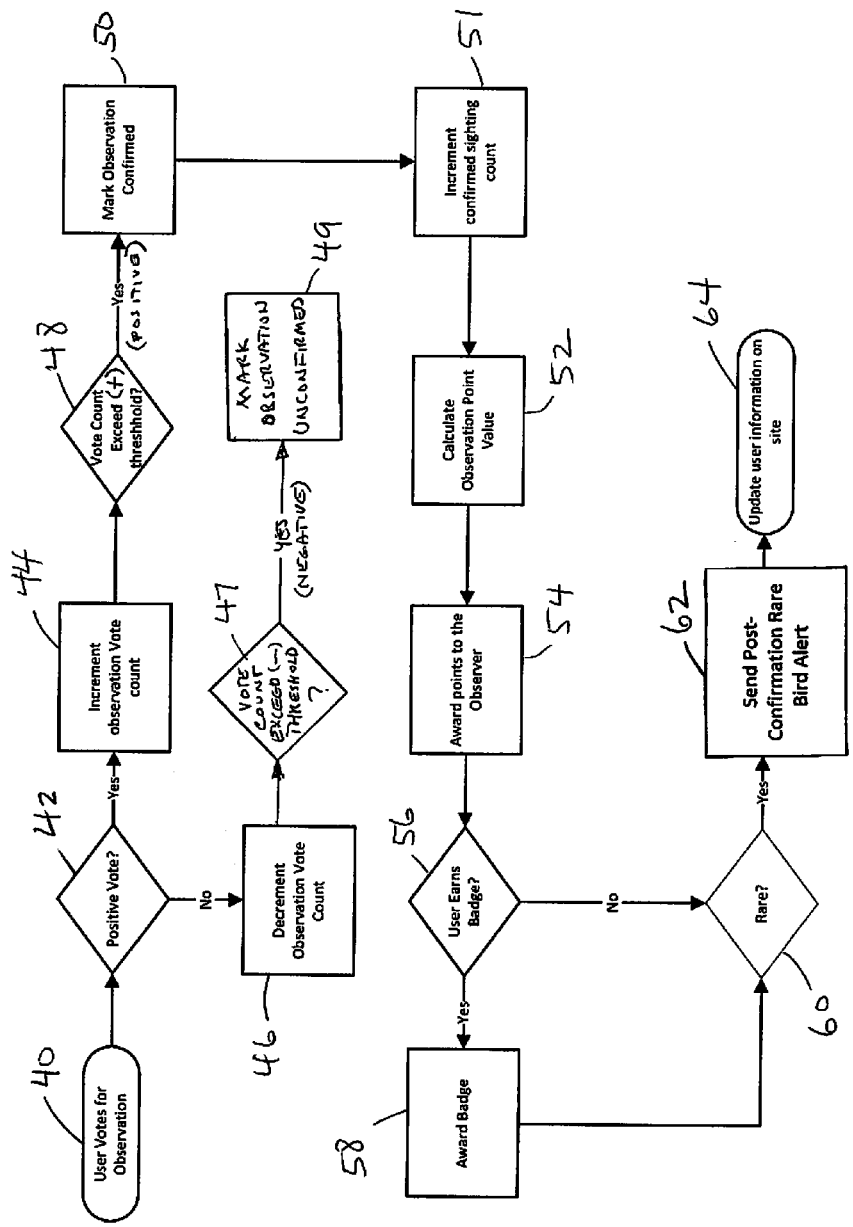
FIG. 4 is a flow chart showing automatic rare species determination.

A major feature of the Trillity system is voting. Voting is a way to improve the accuracy of observation reporting. It is a form of "crowd sourcing", which uses the wisdom of a group in making decisions. Basically users vote on whether they believe an observation made by a user is valid (an up vote) or invalid (a down vote). Validity is based on criteria such as, is the species in its usual range during the date the observation was made? Is the species too rare to be seen at the location? Is there supporting evidence such as photos or recordings? Were other people available when the observation was made? When an observation is confirmed it is assigned points using a specific formula that considers the rarity of the species and other factors. FIG. 4 is a schematic flow chart demonstrating voting, indicating what occurs in the system when a user registers an "up" or "down" vote (valid or not valid) on an observation made by another user. See FIG. 8, a screen shot exemplifying what the user will see for voting, at upper left.

FIG. 4 indicates the user votes on an observation in the block 40. If a positive vote (block 42), the vote count for this particular observation is incremented by 1, noted in the block 44. If not, the observation vote count is decremented by 1 (block 46). The decision block 48 shows that if the net vote count on this observation (total valid or positive votes less total invalid or negative votes) exceeds a numerical threshold preset in the system (e.g. 5), the system marks this observation as confirmed (block 50). Then, for the particular user/observer who made the observation, the block 51 shows that the observer's species sighting count is incremented. Next, in the block 52, the system calculates a points value of this observation, which can be by the formula set out below, or in any event, based primarily on rarity of the sighting but optionally with other criteria for added points. Points are awarded to the observer (block 54) and the system proceeds to the decision block 56, whether the points of the observer are sufficient to earn him a badge, which could be a first, base level badge or a step up from an existing level to a higher level badge. If so the appropriate level badge is awarded to the observer, as at 58. Whether or not the observer is awarded a badge, the system determines automatically whether this was a rare species observation (decision block 60), as discussed previously relative to FIG. 3 and as further explained below (with reference to FIG. 5). If based on preset criteria this is indeed a rare sighting, a post-confirmation rare bird alert (in the case of birds) is sent out to users, as noted in the block 60. The final block 64 indicates the system displays updated user information on the web site, meaning the confirmation will appear to all users if public, unless the observation has been filtered out by some users. However, as noted above, the rare species alert can be made in two ways, post-confirmation as indicated in FIG. 4 or pre-confirmation, before the observation has been confirmed. Both pre-confirmation and post-confirmation alerts can be sent out, but with notation as to whether they have been confirmed. This is also explained above in the context of FIG. 3, which shows sending of rare species alerts prior to confirmation.

Note that continued voting on the observation could occur if neither the positive or negative threshold is met at the block 48. Thus, the system imposes a limit on voting, preferably a time limit or a voting termination based on a maximum number of votes that can be received on the observation. If voting is terminated in this way the vote is non-determinative and the user may want to later re-post the observation with better substantiation.

The following are features of voting in a preferred embodiment of the system.

Voting Values: An up vote is worth 1 point and a down vote is worth −1 points. Votes are cumulative (added together) so two up votes and one down vote results a current vote level of 1. It is possible that the number of up and down votes can become large but still result in 0 in which case the observation remains undetermined.

Confirmation: In order for a species vote to be considered confirmed or unconfirmed the number of up or down votes must cross a certain number or threshold set by the administrator. For example, 5 up votes means valid and 5 down votes means invalid (unconfirmed). A percentage could be used rather than a net number. Note that in FIG. 4 the "yes" at block 48 assumes a positive (+) threshold has been met and the observation is confirmed. If a negative (−) threshold is met, as at decision block 47, then the observation is marked unconfirmed (block 49).

Scoring

Points: A validated observation receives a number of points based on several variables described below.

Species Rarity: All species have a rarity ranking. The rarity ranking is derived from "The tent Red List of Threatened Species" conservation status ranking (tent) and its overall population numbers. The more rare, the more a confirmed species is worth. Basically rarity is based on any of (or combinations of) three criteria: low population of the species; species being out of its usual range (and distance from usual range); and unusual season or time of observing species.

Figure 5:
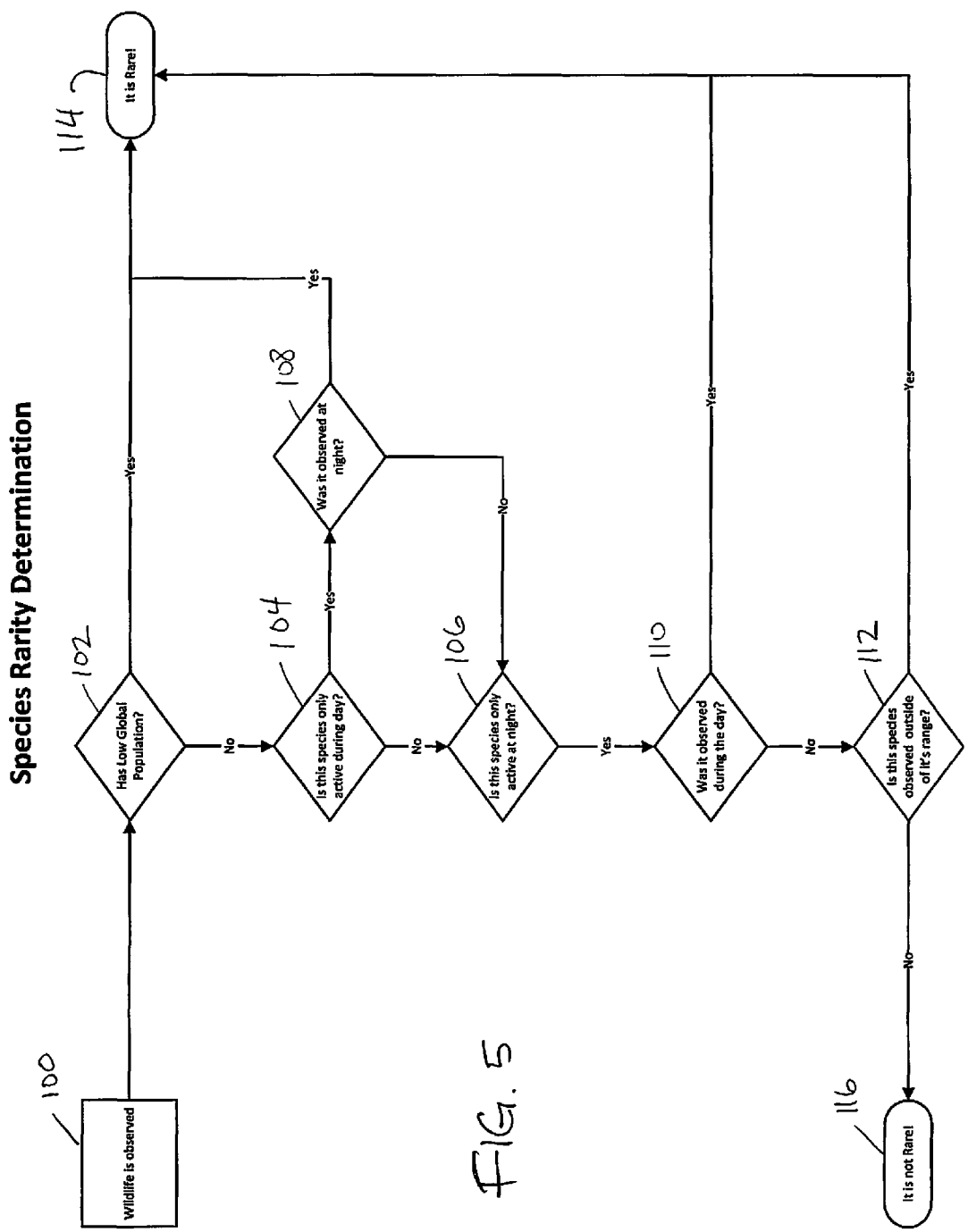
FIG. 5 is a simplified diagram illustrating distribution of observations, particularly involving the following function of the system.

FIG. 5 is a simplified flow chart showing automatic determination of whether an observation has found a rare species. In the block 100, a wildlife species is observed. As discussed, there are several criteria as to whether this is determined to be a rare species. The determination can be based on a low global population of the species, as in the decision block 102. It can also be based on whether the species is active normally only during the day (decision block 104), or normally only at night (decision block 106). If a day species is observed at night (block 108) or a night species in observed in daytime (block 110), the sighting is rare. These day/night criteria should also be considered to include off-season sightings.

The other criterion is whether the species was observed outside of its range, as in the decision block 112, and distance from range (more distant gives more points). If so, it is again a rare species sighting (block 114). Otherwise, if none of the rare sighting criteria is met, the species is not rare, indicating the decision block 116.

A system-wide multiplier is used to create distance between user scores. This is part of the scoring algorithm. A "multiplier" makes scores vary more greatly. It is more exciting to see wide variances in scores, such as 15,000 to 12,000 than 300 to 250.

Scores: Once an observation becomes confirmed the user who made it receives a number of points. Unconfirmed observations receive no points (e.g. there is no penalty for being wrong).

User scores ("Trillity scores") are updated using an algorithm.

a. If votes are a net positive $$\text{Score}=\text{Score}+(\text{Rarity}\times\text{Multiplier})+\text{Night}(\text{value}=1) \text{ OR Day}(\text{value}=0)\times\text{Multiplier}).$$

Optionally, Total Badge Values can be used to add points (see below).

b. If votes are net negative, Score is unchanged.
c. Total Badge Values=sum of all the badges that voted up, where Badge level 1 is worth 10, Badge level 2=20, Badge level 3=30 and Badge level 4=40. So if all votes came from Badge 4 holders (Superior) it would be another 5×40=200 points.
d. Night OR Day means that if a species is seen at night this is more difficult than a species seen by day. Thus, more points are awarded for night observations than day observations, as in FIG. 5.
e. Range Scoring: An important feature of Trillity in its scoring is the ability to compute how far a species is from its normal range or migration. ESRI Maps (arcgis.com/home/) preferably is used for this purpose. All range maps in Trillity are stored in the standard vector-based arcgis shape format. When an observation is made, the location is compared to a shape data map for the species. The distance the observed species is from its normal range is used in computing the score for that species as well as triggering rare species alerts.

Rare Species Alerts

Rare Species Alerts are a key feature of the Trillity patent. They have the potential to take our awareness of what is happening in nature to a whole new level.

a. History: Up until now rare species alerts have been restricted to experts who can tell when an uncommon species has been seen and then spread that information to people who monitor this type of species. For example an expert birder might notice a particular species of bird is feeding at an unusual location and send a message about it by email to a rare bird alert mailing list. People who subscribe to this list will discover the fact if they are reading their email. An entomologist studying insects might identify a type of ant not known to inhabit the area she is monitoring and send a text message to her colleagues.

b. Trillity takes the process of identifying rare species and spreads it among people who may not even know that the observation they have made is highly unusual. When people vote in Trillity it automatically assigns higher values to species which are rare, endangered, or have small populations. Species which are a long way from their normal ranges are assigned high values based on how far away they are.

c. A user can configure Trillity to alert the user with details of an observation that meets the "rarity" threshold via text messages or email. Thus this takes the burden of identifying rare species off the experts and spreads it out among a greater population of citizen scientists and nature lovers.

New Species Alerts

Trillity can also provide alerts if a species is observed but does not meet the criteria of any known species.

Achievements

Birding is greatly enhanced when similar people share their experiences. And when birders meet the topic of choice is what birds they have seen. The more birds each has seen the more impressive that person is, indeed the birder that sees the rare and difficult to identify birds is considered a master. Trillity takes advantage of this most human of emotions—pride—by setting up a series of four achievement badges. These are awarded based on the total number of points a member accumulates as well as a few other things that reveal how great a birder he or she is. The screen shots of FIGS. 6 through 24 show achievement levels.

The Trillity Novice badge is awarded when a member reaches a minimum number of points. This value is set by the administrators so that the member only has to observe about 10 popular birds to qualify.

The Trillity Intermediate badge is awarded when a member reaches enough points to show that they are more than just a casual or armchair birder. This value is set by the administrators so that the member must observe about 50 uncommon birds or 100 popular birds to qualify.

The Trillity Advanced badge is awarded when a member reaches enough points to show that they are more than a serious birder. This value is set by the administrators so that the member must have a life list of over 200 species to qualify. They must also show they have contributed at least 20 hours to a conservation or ecology endeavor.

The Trillity Superior badge is awarded when a member achieves an extraordinary number of points and has shown they are contributing a great deal to the conservation of the planet.

Screen Images

Figure 6:
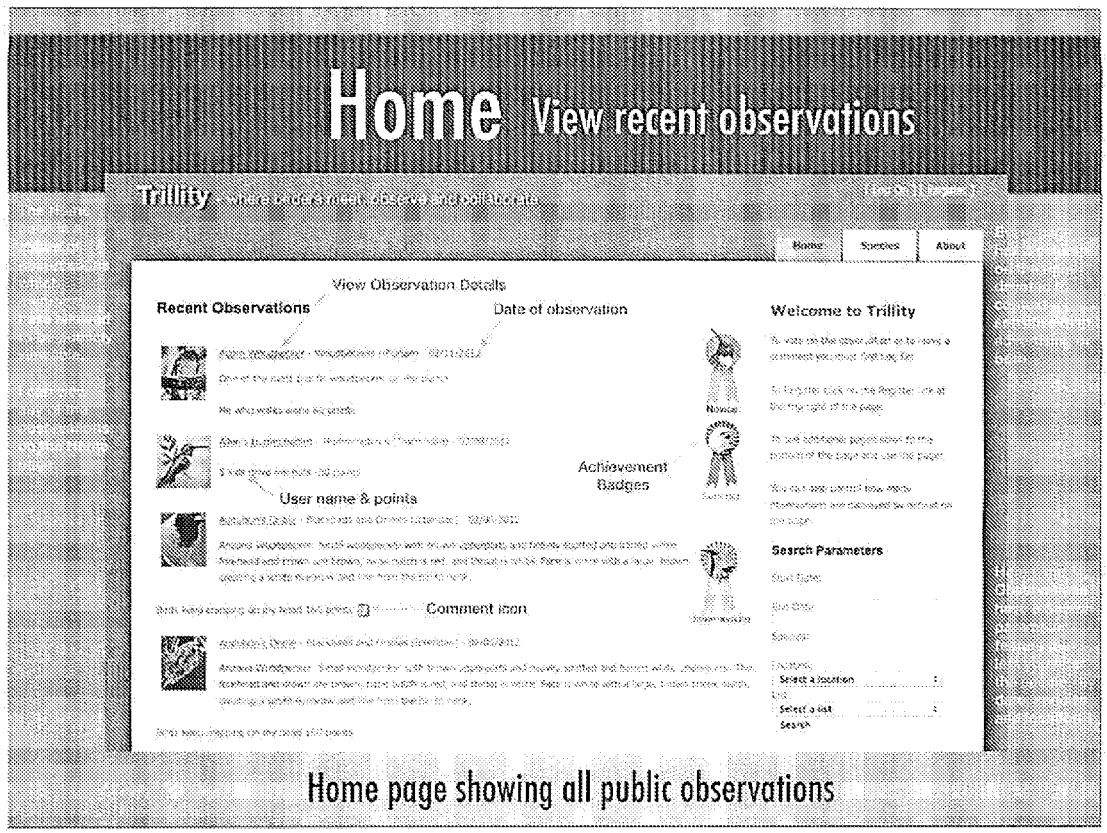

Home—FIG. 6

FIG. 6 includes a screen image which can be called a "Home" page. This can be the basic screen that all users see when they visit the Trillity web site, before signing in. In the examples given in these screen images the species are birds. The primary element on the Home page is one or more observations of particular bird species, seen at specific date and time and at a specific location. Observations are displayed in a row or column in summary form. Details are revealed by clicking on the name of the bird, which opens a separate page for the observation. In this image the first example is the Acorn Woodpecker, and clicking on that name will open the observation details for that sighting (including location and further details). A small thumbnail picture of the bird can be included in the left column, or a photo can be available in the details. As in all the screen images of FIGS. 6-24, these copies include added headings and margin notations and arrows with explanatory text, which do not appear on the web page.

Note the column on the right side of the screen under "Welcome To Trillity". This area preferably is used on most pages as a context sensitive help. Thus, when a user hovers the cursor over an element in the larger area of the screen the definition of how to use that element appears. In this screen it is also being used to give the user/viewer search parameters. They can use the Date field to filter the observations people have left so that only the dates the user enters are shown. The "Location" menu is powerful, allowing the user to select a location on a map along with a radius in miles surrounding that location. It then filters so the viewer only sees birds that have been published by users in the area represented by that radius.

Figure 7:

FIG. 7 is a screen image indicating signing in by a user. The member signs in at the upper right or a new member registers. The web site enables the user to indicate whether their observations are to be made public or kept private. Note the four additional tabs at the top, once a user has signed in, as compared to the three on the Home page. This enables the user to make observations or vote on accuracy of posted observations. Note the four tabs where arrows have been added to this screen shot are for the user's own personal information: Observations; Lists; Locations; and Nest.

Figure 8:
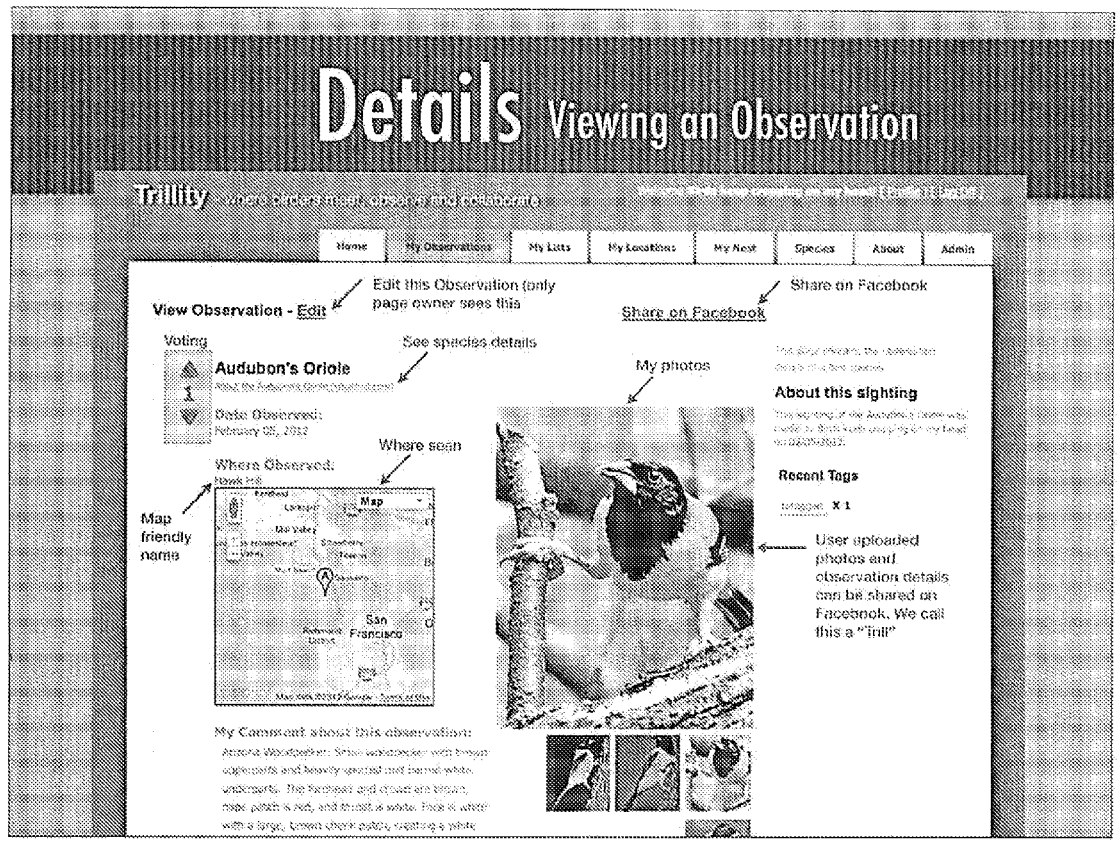
Figure 9:
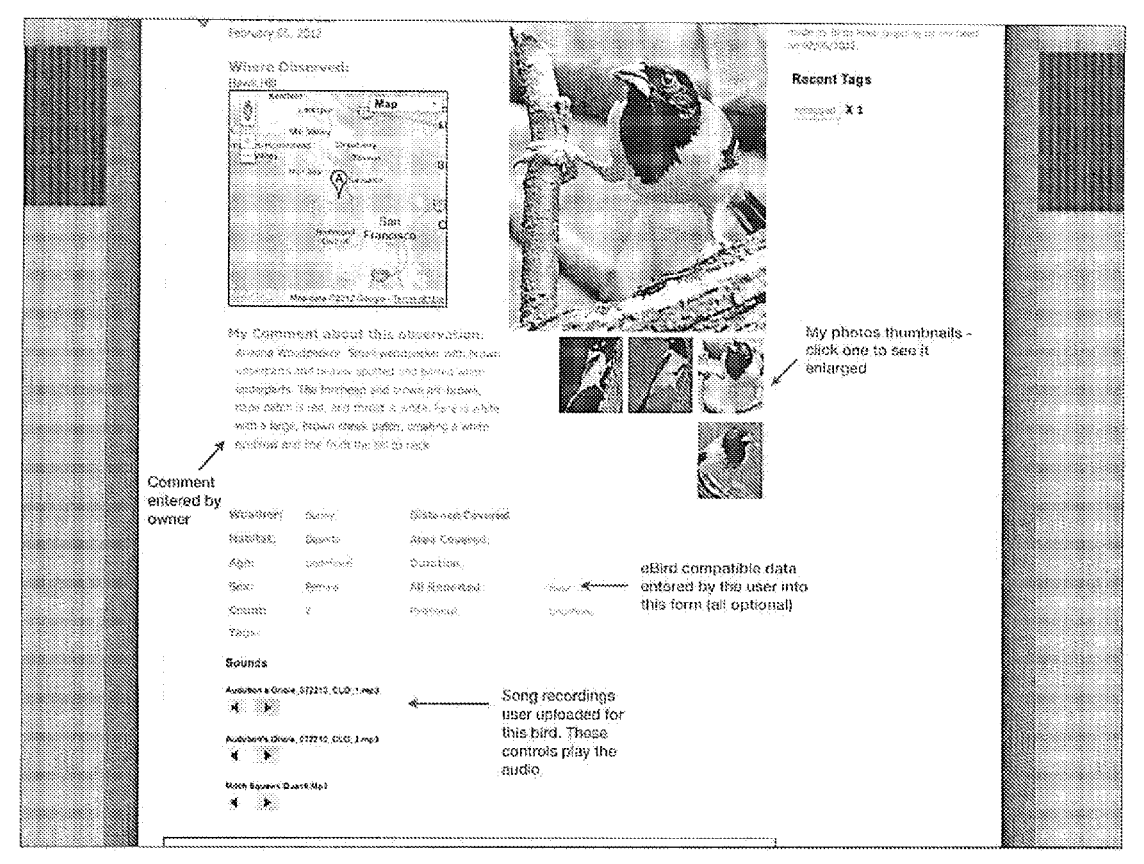
Figure 10:

The screen images shown in FIGS. 8-10 are actually a single screen. This screen shows details regarding an observation entered by a user, in this case for an Audubon Oriole. This is via the "My Observations" tab, enabling the user to view details of the user's own observations. Although the user can view other observations, the "Edit" button at upper left will appear only when viewing one's own observations. This image also includes a map or indicating location, a photo which may be entered, and comments. In addition, the page image shows "Voting" at upper left, which will be applicable when voting is open on another user's posted observation (one does not vote on his own observation). The voting includes "up" and "down" arrows, with a numerical tally presenting the current result of all votes so far, which is a net number. The scrolled-down parts of the image shown in FIGS. 9 and 10 include entry of whether at the time of the observation, habitat, age, sex and count of the species, and provision for other information as noted. Further, birders sometimes record the song of a bird being observed. The system allows these recordings to be uploaded by the member and displayed so viewers can listen to them. To hear them the viewer clicks on the play button provided on the web image. Near the lower end of the image, FIG. 10, is the user profile, which includes the user name, preferably an avatar photo, Trill score, number of confirmed observations, date of joining, interests, and a link to more details which can be seen on the user's personal profile page.

Figure 11:
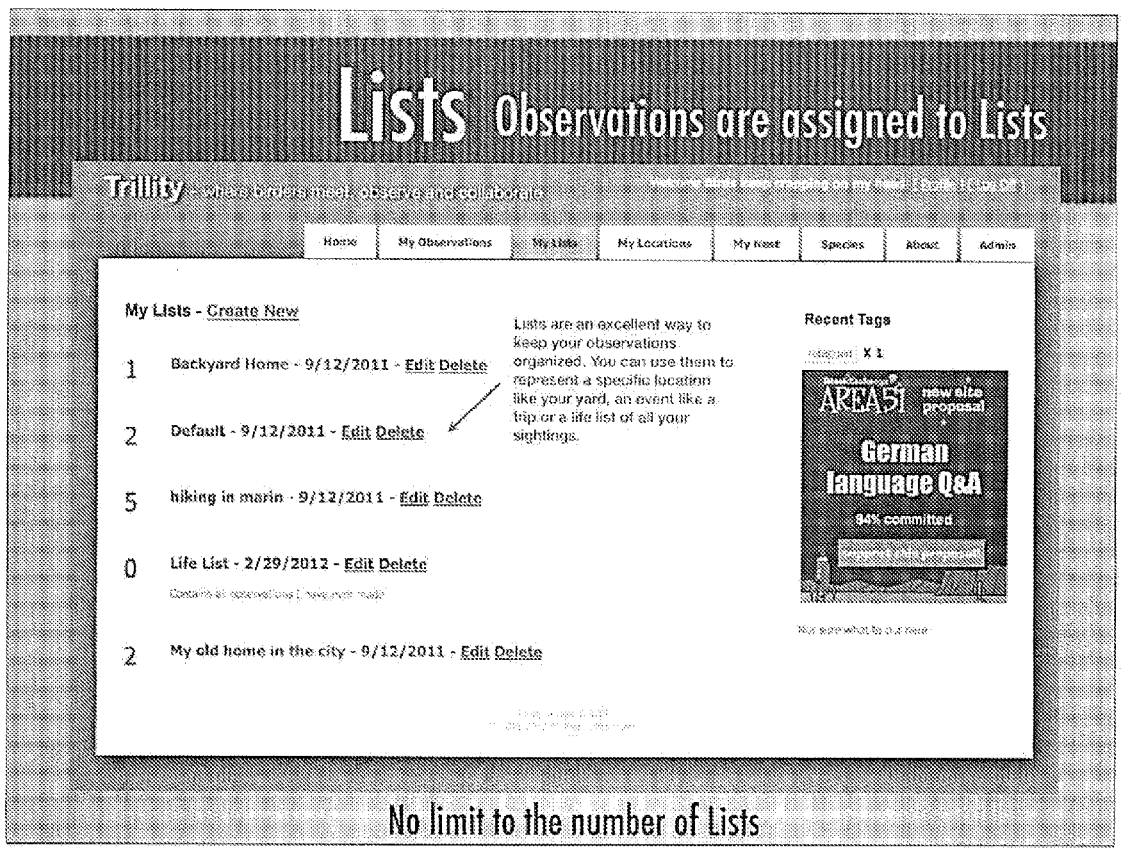

FIG. 11 is a screen image for Lists. Observations are first assigned to a List, essentially a named collection of observations that have something in common, for organizing them at a higher level. This could be, as illustrated, "Back Yard Home to Contain All Observations Made in the User's Back Yard", or other locations which can be noted. The Lists have creation dates. Most birders keep what is called a Life List, a collection of every observation a birder has ever made.

Figure 12:
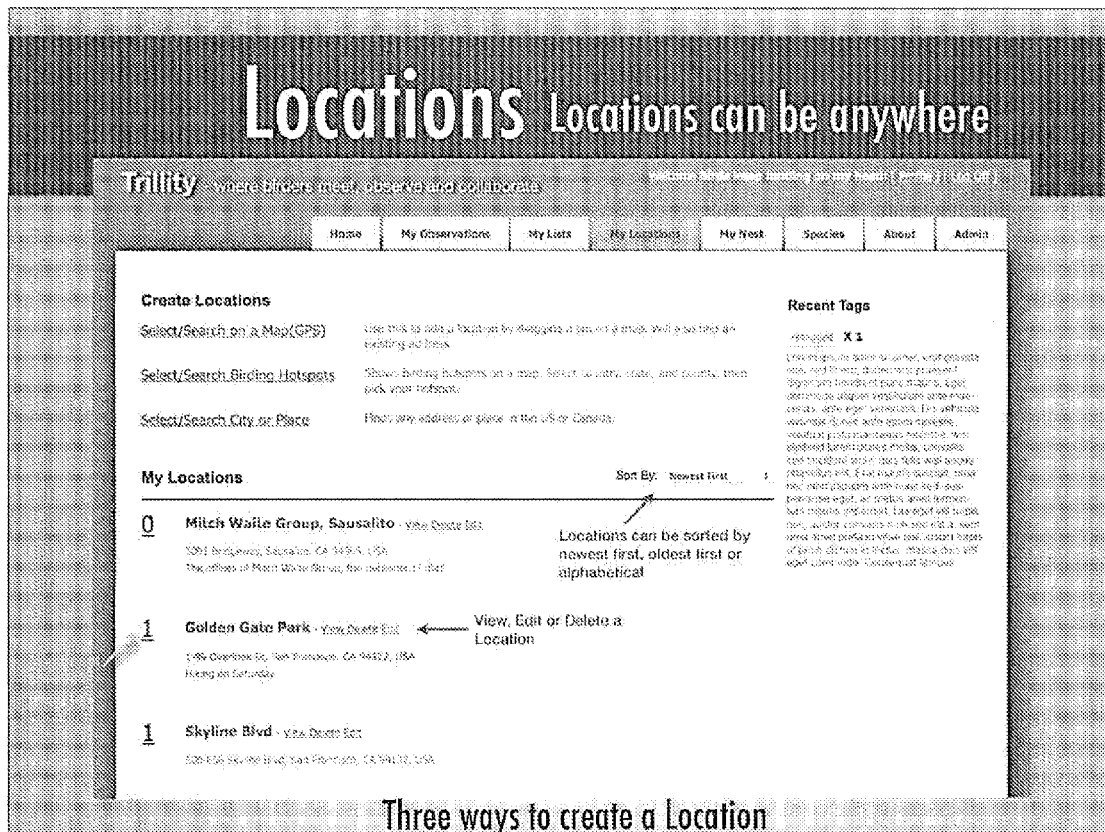

FIG. 12 is a Locations screen image, Location being the first element that must be entered before an observation can be created. The system allows three different ways to create Locations: select/search on a map (GPS); select/search birding Hotspots; and select/search city or place.

Figure 13:
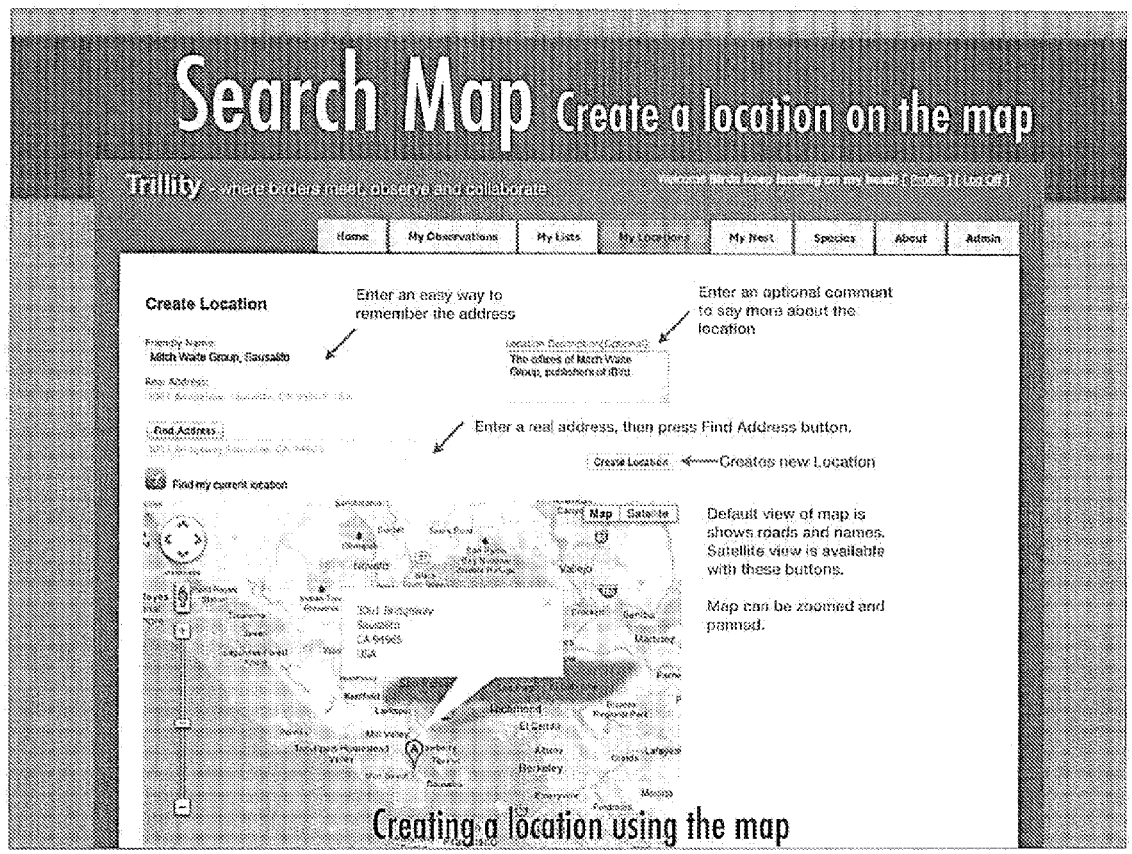
Figure 14:
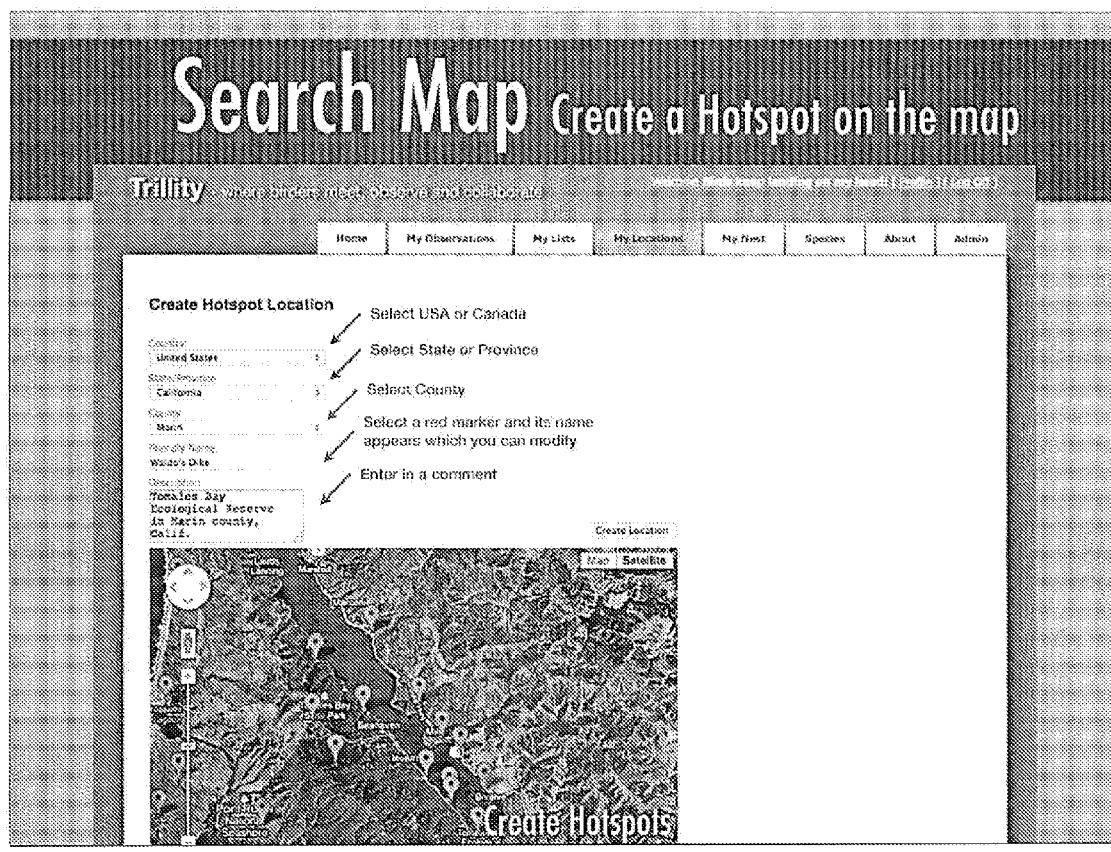

The screen images of FIGS. 13 and 14 relate to creating a location or a Hotspot on a map. FIG. 13 demonstrates select/search on a map (GPS), displaying a map and a place to enter a real address, or drag a pin on a map to identify a specific location. This requires connection to the Internet. The system allows use of an informal or symbolic name to represent the location, but the real address is retained. FIG. 14 demonstrates use of a map to create birding Hotspots, or to view Hotspots that have already been entered into the system.

Figure 15:
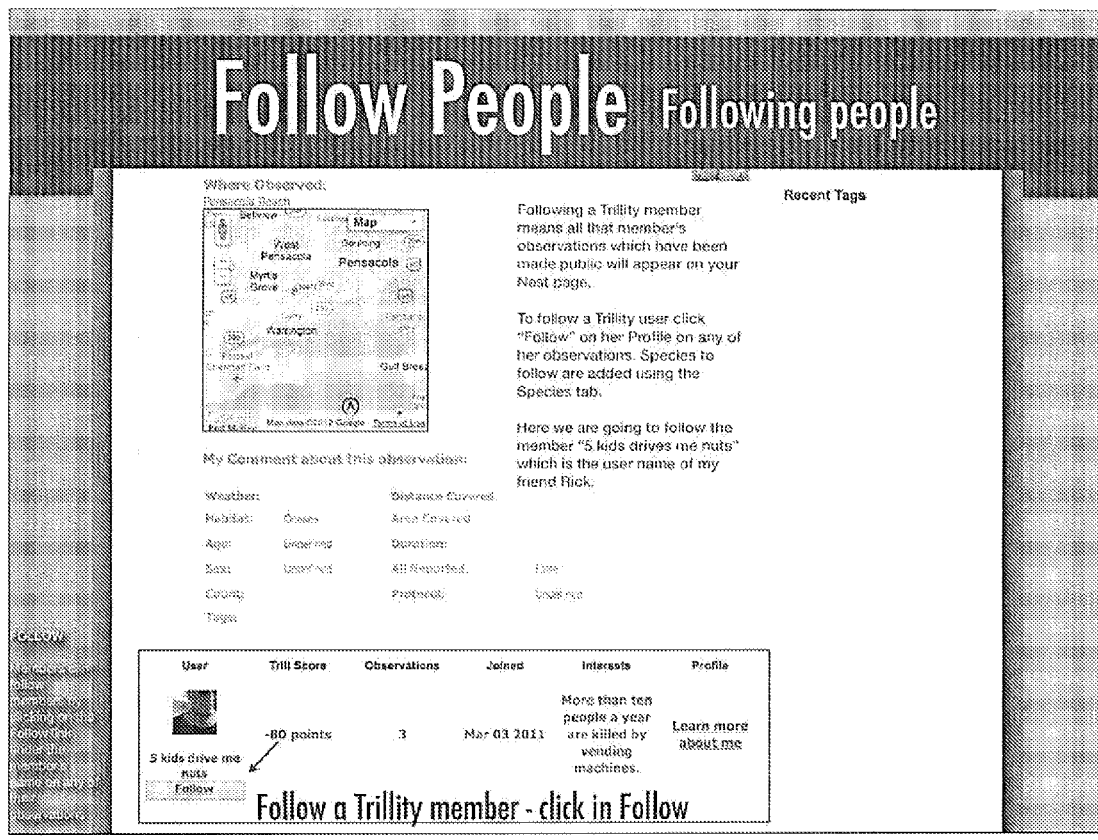
Figure 16:

FIGS. 15 and 16 are screen images of the web-based system relating to Follow. Any member who has made public observations may be followed by clicking on the Follow link under the name in the profile area of the observation, as indicated at lower left in the image. Pursuant to following, all observations of the followed member will appear on the My Nest page (FIGS. 17 and 18).

In FIG. 16 a particular bird species is followed, so that every public observation of that species by other members will appear on the user's My Nest page. A user can simply use the "Species" tab at the top of the page to find the bird of interest. As explained above, a particular location can also be followed.

Figure 17:
Figure 18:
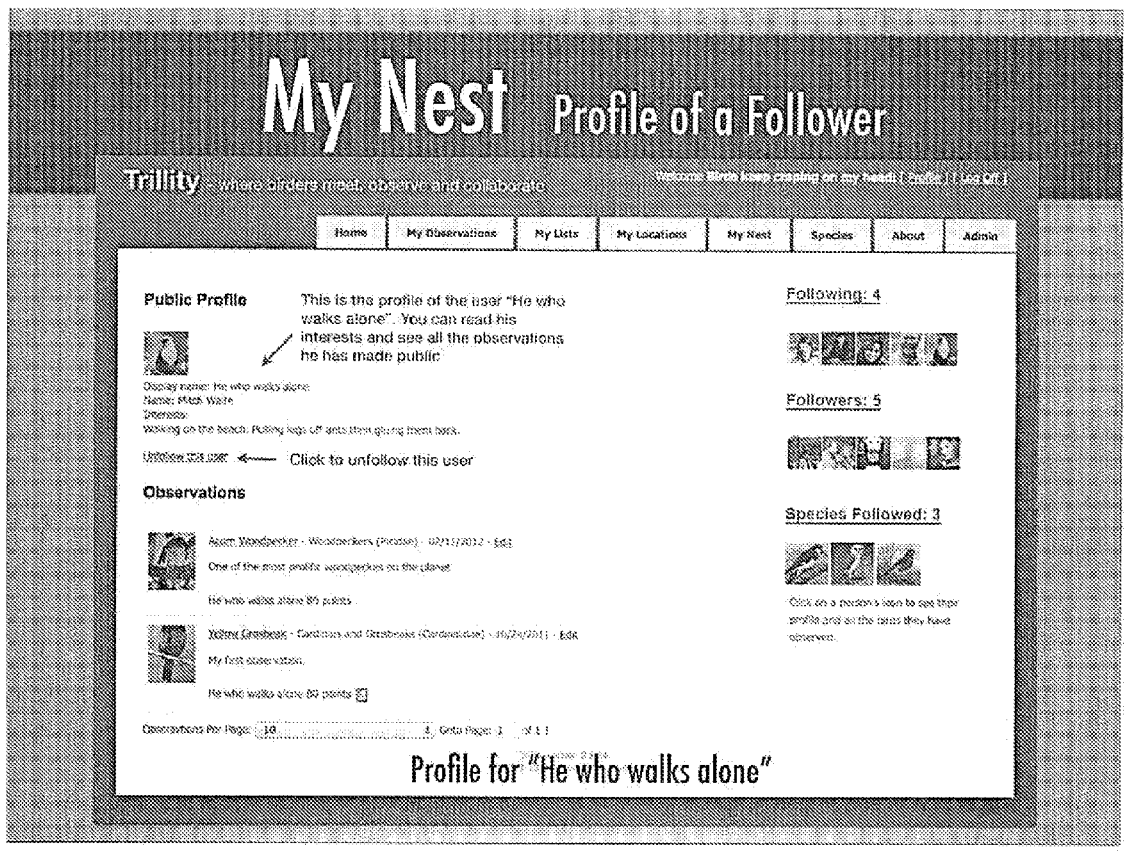

FIG. 17 is a My Nest page, posting observations of the people being followed by the user, who those people are, and, on the other hand, people following the user. The screen also shows bird species being followed by the user. FIG. 18 is a screen image showing a profile of a certain member/user. When one clicks on the name of a person he is following, the web site shows that person's public profile. A link for "unfollow this user" is included.

Figure 19:
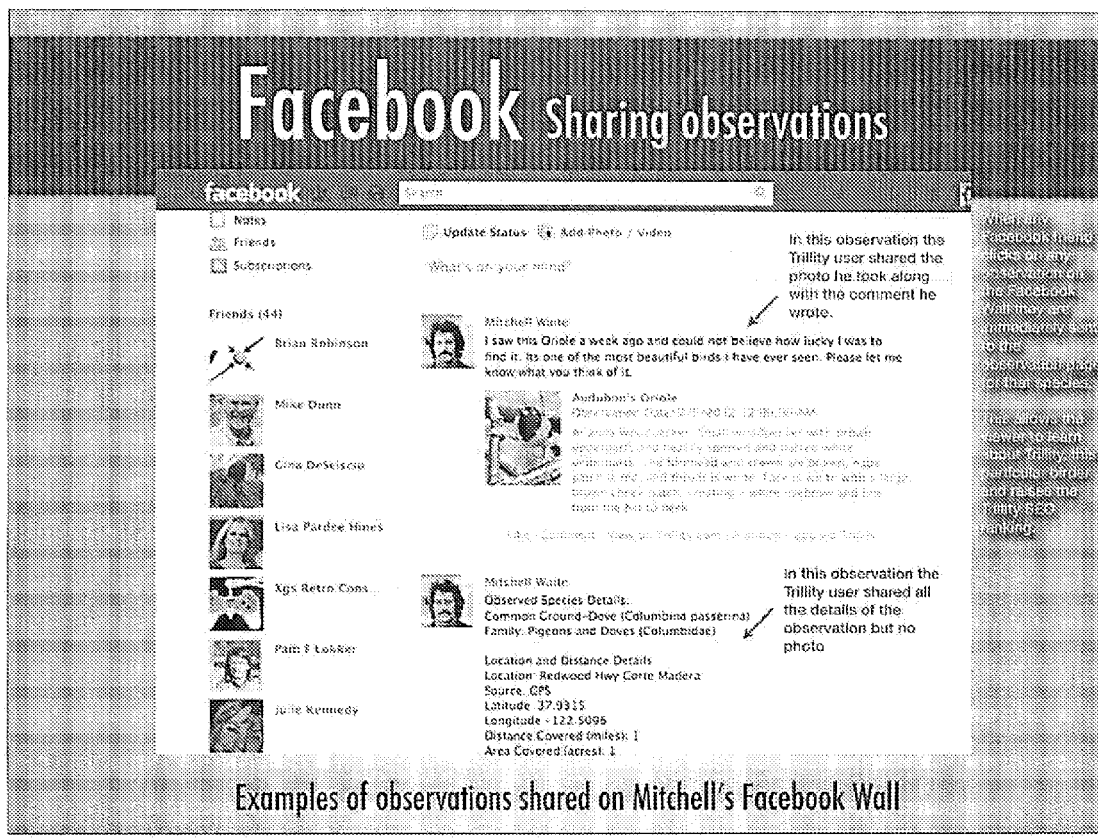

FIG. 19 indicates sharing observations on Facebook. A "Share on Facebook" link appears on every observation page. This enables a user making observations public to send those observations across the Internet. When any Facebook friend clicks on any observation on the Facebook Wall, he is immediately sent to the observation page for that species. This allows the viewer to learn about the Trillity system and about this particular birder.

FIG. 20 is a screen image indicating administrator control. The system for awarding points is controlled by the administrators of the Trillity system. Formulas for points are explained above. This image shows the way the administration screen works for setting up one element of the point system: Rarity. As can be seen, a value between 1 and 10 is placed in the Rarity column, and this preferably is multiplied by 10. The rarer a bird, the higher the value and thus the more points assigned for a sighting of that bird, once the observation is confirmed.

FIGS. 21-24 show examples of screen images which can be displayed for the awards function of the system. The awards can include four different levels, identified here as "Novice", "Intermediate", "Advanced" and "Superior". The Novice award is obtained when a member reaches a lowest award level, which could be, for example, a level of points typically obtained when a user has sighted about ten popular birds. The second, Intermediate level is set at a points level that generally indicates the user is more than a casual birder. The administrators generally set this number so that a member must observe approximately 50 uncommon birds, or 100 popular birds, to qualify for the Intermediate award. The third and fourth levels, Advanced and Superior, have points levels set considerably higher, with the Superior award being for extraordinary birders with a very high number of points.

Search

The home page can be searched by species, date/time or location. All observations meeting the specified criteria is displayed.

Tags

Observations can be tagged.

Single word meta data can be attached to an observation.

A tag cloud of recent and popular tags are displayed on each page of the site.

Species Management

As new species are added and removed from the database, its families, orders and other species specific info can be edited. A species is also assigned a rarity value to be used in score calculation and rare bird alerts.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A social network system for posting observations and sharing of information on observations of wildlife species among a multiplicity of users who are observers of wildlife species, comprising:
 a central system with a server capable of communicating by Internet with computers or handheld computer devices of a multiplicity of users,
 the central system having registration means for receiving, via users' computers or handheld computer devices, registration information entered by each user, including at least user name, email address, home location and whether the user's observations are to be made public in the system,
 the central system also including means for receiving species observation information posted by each of the multiplicity of users, the species observation information including at least species name, location of observation, date and time of observation,
 the social network system further including validation means for peer validation of users' posted species observations, by enabling users to vote on likely validity of other users' posted observations and means in the central system for tabulating votes and assigning a confirmed or unconfirmed status to the observation based on the votes, and
 the social network system having filter means enabling each user to restrict types of other users' observations to be sent to the user.

2. The social network system of claim 1, wherein the central system includes means for automatically generating rare species alerts based on location of an observation, season or time of day of an observation, or low numbers of a species believed to exist.

3. The social network system of claim 1, wherein the filter means includes means settable by a particular user for displaying for the particular user only observations of certain users, of certain birds, of certain locations, or of certain seasons, dates or times of day.

4. The social network system of claim 1, further including following means provided by the central system enabling one user to follow another particular user, a particular location, or a particular species, as selected by the one user, so that all observations from a selected particular user are displayed to the one user, or all species sightings at a selected location are displayed to the one user, or all observations of a particular species anywhere are displayed to the one user, or all observations of a selected species at a selected location are displayed for the one user.

5. The social network system of claim 1, wherein the validation means counts positive and negative votes and indicates an observation is valid if a certain number or percentage of votes are positive.

6. The social network system of claim 1, wherein the central system further includes award means for awarding points to a user whose observation has been voted valid, with number of points awarded being related to rareness of an observed species, and wherein the award means stores an accumulated total of points for each user.

7. The social network system of claim 5, wherein the voting means of the central system is a decision engine monitoring all observations, with means for adjusting a number of votes required for validity, based on the total number of votes.

8. The social network system of claim 1, wherein the wildlife species are birds.

9. The social network system of claim 1, wherein each species observation includes species, time and date of observation and location of observation, and at least some of the following: weather at the time of observation, physical condition of the observed species, approximate age of observed species, sex of observed species, habitat at the species observation, latitude and longitude of the species observation, duration in minutes of the species observation, number of persons making the observation, creation date when the species observation is entered into a computer or hand-held computer device of the user, and data in the form of audio and/or images of the observed species.

10. The social network system of claim 9, further including map displaying means provided by the central system on the computer or hand-held computer device of the user, with locator means enabling the user to indicate on the map the location of an observation.

11. The social network system of claim 1, wherein the central system includes friend means providing a friend mode for sharing of all species observation between two users.

12. The social network system of claim 1, wherein the central system includes achievement award means for accumulating points of users and, based on number of points, granting awards at a series of different levels based on number of points accumulated by users.

13. A method providing and operating a social network system for wildlife species observations posted by a multiplicity of users on the Internet-based network, under the control of a central server linked to computers, tablets or hand-held computer devices of users, comprising:
providing an Internet web site including multiple pages, with ability for users to register with user name and other required user information, log in to the web site, and post species observations made by a user,
with the central server, receiving and storing information relating to observations posted by users,
displaying on the web site posted observations of a multiplicity of users, for viewing by users of the web site,
enabling each user of the web site to vote on likely validity of posted observations of other users, with a positive or negative vote on validity of each posted observation, and
counting votes on a posted observation via the central server and applying preset criteria to the count of positive and negative votes automatically to confirm or not confirm a posted observation, and indicating on the web site a confirmed status or a non-confirmed status of a posted observation.

14. The method of claim 13, wherein the web site further enables each user to compile a list of the user's observations, and stores the list for the user.

15. The method of claim 13, further including assigning points to a user for an observation that has been confirmed.

16. The method of claim 15, wherein points are awarded based on a formula that considers rarity of the confirmed species observation.

17. The method of claim 13, further including enabling a user to follow posted observations made by another selected user.

18. The method of claim 13, further including enabling a user to follow all posted observations of a selected wildlife species.

19. The method of claim 13, further including enabling a user to follow all posted observations at a particular location selected by the user.

20. The method of claim 13, further including automatically issuing via the web site a rare species alert when a posted observation is determined by the central server, according to stored criteria, to be a rare sighting.

21. The method of claim 20, wherein the rare species alert is issued for a posted observation prior to confirmation.

22. The method of claim 20, wherein the rare species alert is issued for a posted observation after confirmation.

23. The method of claim 13, further including maintaining on the web site a score for each of a series of participating users, the score being based on confirmed species observations and points earned by a user for each confirmed observation, points being awarded according to a formula that includes rarity of a sighting.

24. The method of claim 23, further including granting awards, at multiple levels of achievement, for users who attain scores reaching specified levels of points.

25. The method of claim 13, further including enabling a user posting a wildlife observation on the web site to select whether the observation will be private or will be public, available to all users.

* * * * *